United States Patent
Zhou et al.

(10) Patent No.: US 7,711,049 B2
(45) Date of Patent: May 4, 2010

(54) METHOD FOR FAST MACROBLOCK MODE DECISION BASED ON MOTION COST OF VARIABLE BLOCK SIZE

(75) Inventors: Zhi Zhou, Seattle, WA (US); Ming-Ting Sun, Mercer Island, WA (US); Shin-Huang Chang, Tainan (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1363 days.

(21) Appl. No.: 11/149,363

(22) Filed: Jun. 10, 2005

(65) Prior Publication Data

US 2006/0203911 A1    Sep. 14, 2006

(30) Foreign Application Priority Data

Mar. 9, 2005  (TW) ............................. 94107220 A

(51) Int. Cl.
*H04N 7/12* (2006.01)
(52) U.S. Cl. .............................................. 375/240.16
(58) Field of Classification Search ............. 375/240.16
See application file for complete search history.

(56) References Cited

U.S. PATENT DOCUMENTS 6,782,052 B2   8/2004   Sun et al.
2005/0135484 A1*   6/2005   Lee et al. ............... 375/240.16

OTHER PUBLICATIONS

P. Yin, H. Tourapis, A. Tourapis, and J. Boyce, "Fast Mode Decision and Motion Estimation for JVT/H.264," IEEE ICIP, Aug. 2003.*
A. Puri, et al., "Interframe Coding with Variable Block-Size Motion Compensation," Globecom '87, vol. 1. Tokyo, Japan, Nov. 1987, pp. 65-69.*
Zhi Zhou et. al., *Fast Macroblock Inter Mode Decision And Motion Estimation For H.264/MPEG-4 AVC;* IEEE International Conference on Image Processing; Oct. 2004, pp. 789-792.

* cited by examiner

*Primary Examiner*—Y. Lee
*Assistant Examiner*—Richard Torrente
(74) *Attorney, Agent, or Firm*—Bacon & Thomas, PLLC

(57) ABSTRACT

A method for fast macroblock mode decision is disclosed. The method includes: (A) determining if a motion cost at the origin (0, 0) or a prediction motion vector (PMV) for a 4n*4n macroblock is smaller than a first threshold; (B) if the motion cost is smaller than the first threshold, determining a macroblock mode as 4n*4n and ending the method; (C) if the motion cost is not smaller than the first threshold, using an adaptive diversity search strategy to perform motion estimation on four 2n*2n blocks associated with the 4n*4n macroblock; (D) determining if all motion costs of the four 2n*2n blocks in step (C) are smaller than a second threshold; and (E) if step (D) determines that the motion costs of the four 2n*2n blocks are smaller than the second threshold, determining the macroblock mode as 2n*2n and ending the method.

20 Claims, 5 Drawing Sheets

| Mode Decision Path | Best Mode | Number of Modes Excluded |
|---|---|---|
| Path A | 16*16 | 7(All) |
| Path B | 8*8 | 6(All except 8*8) |
| Path D | 16*16, 16*8, 8*16 | 3(4*8, 8*4, 4*4) |
| Path C -> Path E | 8*8 | 2(16*16 and 4*4) |
| Path C -> Path F | 4*8, 8*4, 4*4 | 1(16*16) |

FIG. 3

| QP | | Bit-Rate (kb/s) | PSNR (dB) | Run Time |
|---|---|---|---|---|
| 15 | LCM-FFS | 1171.03 | 45.90 | 1 |
| | LCM-MSS | 1193.45 | 45.87 | 0.69(-31%) |
| | Invention | 1209.89 | 45.82 | 0.52(-48%) |
| 25 | LCM-FFS | 328.49 | 38.25 | 1 |
| | LCM-MSS | 348.82 | 38.25 | 0.71(-29%) |
| | Invention | 351.96 | 38.19 | 0.52(-48%) |
| 35 | LCM-FFS | 95.33 | 31.66 | 1 |
| | LCM-MSS | 100.54 | 31.56 | 0.66(-34%) |
| | Invention | 105.70 | 31.55 | 0.48(-52%) |

FIG. 4

| QP | | Bit-Rate (kb/s) | PSNR (dB) | Run Time |
|---|---|---|---|---|
| 15 | LCM-FFS | 1312.46 | 47.58 | 1 |
| | LCM-MSS | 1329.50 | 47.60 | 0.65(-35%) |
| | Invention | 1341.00 | 47.60 | 0.48(-52%) |
| 25 | LCM-FFS | 390.62 | 41.82 | 1 |
| | LCM-MSS | 394.01 | 41.85 | 0.62(-38%) |
| | Invention | 398.69 | 41.85 | 0.45(-55%) |
| 35 | LCM-FFS | 145.87 | 35.78 | 1 |
| | LCM-MSS | 147.46 | 35.82 | 0.64(-36%) |
| | Invention | 149.21 | 35.82 | 0.43(-57%) |

FIG. 5

| QP | | Bit-Rate (kb/s) | PSNR (dB) | Run Time |
|---|---|---|---|---|
| 15 | LCM-FFS | 9195.10 | 45.56 | 1 |
| | LCM-MSS | 9167.35 | 45.55 | 0.72(-28%) |
| | Invention | 9217.85 | 45.53 | 0.53(-47%) |
| 25 | LCM-FFS | 3812.88 | 36.98 | 1 |
| | LCM-MSS | 3854.23 | 36.98 | 0.70(-30%) |
| | Invention | 3883.99 | 36.94 | 0.52(-48%) |
| 35 | LCM-FFS | 1017.22 | 28.60 | 1 |
| | LCM-MSS | 1055.57 | 28.61 | 0.70(-30%) |
| | Invention | 1074.99 | 28.61 | 0.51(-49%) |

FIG. 6

| Mode Decision Path | Best Mode | Number of Modes Excluded | Percentage | | |
|---|---|---|---|---|---|
| | | | QP=15 | Qp=25 | Qp=35 |
| Path A | 16*16 | 7 | 17% | 25.3% | 27.7% |
| Path B | 8*8 | 6 | 34% | 20% | 4.3% |
| Path D | 16*16, 16*8, 8*16 | 3 | 7.1% | 31.7% | 48.6% |
| Path C -> Path E | 8*8 | 2 | 16.7% | 7.5% | 17.1% |
| Path C -> Path F | 4*8, 8*4, 4*4 | 1 | 24% | 15.3% | 0.5% |
| Average Number of Modes Excluded per MB | | | 4.02% | 4.23% | 4 |
| Calculation Reduction | | | 57% | 60% | 57% |

FIG. 7

METHOD FOR FAST MACROBLOCK MODE DECISION BASED ON MOTION COST OF VARIABLE BLOCK SIZE

BACKGROUND OF THE INVENTION

1. Field of the Invention

The invention relates to the technical field of motion estimation and, more particularly, to a method for fast macroblock mode decision.

2. Description of Related Art

Current video coding standards essentially use a motion estimation (ME) to remove redundancies in an image sequence and thus achieve high image compression efficiency. In the H.264/MPEG-4 AVC video coding standard, a variable blocksize motion compensation is used to improve the coding efficiency. In general, there are 16*16, 16*8, 8*16 and 8*8 blocksize modes for a macroblock (MB) level and 8*8, 4*8, 8*4 and 4*4 blocksize modes for a sub-macroblock (sub-MB) level.

In conventional techniques, the motion estimation and the macroblock mode decision are concurrently performed. For each blocksize, the motion estimation is first performed, and a resulting motion cost is used for the mode decision, which relatively increases computational amount.

To overcome the problem of dramatically increasing the computational amount of a macroblock decision, U.S. Pat. No. 6,782,052 has disclosed a solution to compute a mode frequency prediction for a current block in accordance with the mode frequencies of blocks neighboring the current block. As shown in FIG. 1, block E is the current block, and its neighboring blocks are blocks A, B, C and D. In this case, block modes mA, mB, mC and mD are determined for the blocks A, B, C and D respectively and next their frequencies $F_{mA}$, $F_{mB}$, $F_{mC}$ & $F_{mD}$ are determined. Thus, the mode frequency prediction ($F^0$) is computed and represented as $\alpha \times \min(F_{mA}, F_{mB}, F_{mC}, F_{mD})$ where $\alpha$ is smaller than one and greater than zero. If a mode m has a frequency $F_m$ smaller than the prediction ($F^0$), the mode m is eliminated. The macroblock mode decision can reduce some modes, but the computational amount for such a decision is still large when a current block and its neighboring blocks are related low so as to relatively reduce the efficiency.

Therefore, it is desirable to provide an improved macroblock mode decision method to mitigate and/or obviate the aforementioned problems.

SUMMARY OF THE INVENTION

The object of the invention is to provide a fast macroblock mode decision method, which can overcome the problem of large computational amount generated in the prior art and further increase coding efficiency.

In accordance with one aspect of the present invention, there is provided a method for fast macroblock mode decision. The method is used in an image frame coding. The method comprising: (A) calculating a motion cost at the origin (0, 0) or a prediction motion vector (PMV) for a 4n*4n macroblock; (B) deciding a macroblock mode as 4n*4n if the motion cost calculated in step (A) is smaller than a first threshold and ending the method; (C) using an adaptive diversity search strategy to perform motion estimation on four 2n*2n blocks associated with the 4n*4n macroblock if the motion cost calculated in step (A) is greater than or equal to the first threshold; (D) calculating all motion costs of the four 2n*2n blocks; and (E) deciding the macroblock mode as 2n*2n if the motion costs of the four 2n*2n blocks calculated in step (D) are smaller than a second threshold.

In accordance with another aspect of the present invention, there is provided a method for fast macroblock mode decision. The method is used in an image frame coding. The method includes: (A) determining if a motion cost at the origin (0, 0) or a prediction motion vector (PMV) for a 4n*4n macroblock is smaller than a first threshold; (B) if the motion cost is smaller than the first threshold, deciding a macroblock mode as 4n*4n and ending the method; (C) if the motion cost is greater than or equal to the first threshold, using an adaptive diversity search strategy to perform motion estimation on four 2n*2n blocks associated with the 4n*4n macroblock; (D) determining if all motion costs of the four 2n*2n blocks in step (C) are smaller than a second threshold; and (E) if step (D) decides that the motion costs of the four 2n*2n blocks are smaller than the second threshold, choosing the macroblock mode as 2n*2n and ending the method.

Other objects, advantages, and novel features of the invention will become more apparent from the following detailed description when taken in conjunction with the accompanying drawings.

BRIEF DESCRIPTION OF THE DRAWINGS

FIG. 3 is a comparison table of excluded mode numbers at different mode decision paths and best modes;

FIGS. 4, 5, 6 are comparison tables of a prior low-complexity mode with fast full-search (LCM-FFS), a prior low-complexity mode with fast merge-split search (LCM-MSS) and the invention under different image sequences respectively; and FIG. 7 is a table of mode exclusion rate and computation reduction analysis.

DETAILED DESCRIPTION OF THE PREFERRED EMBODIMENT

Figure 1:
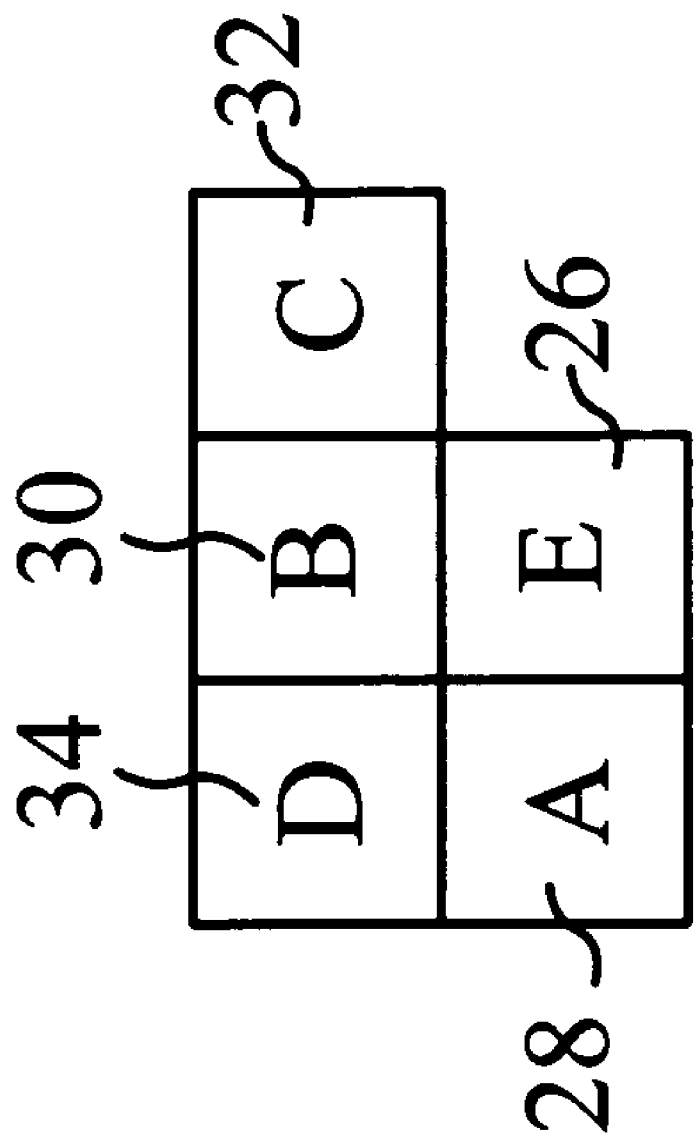
FIG. 1 is a diagram illustrating an image block and its neighboring image blocks in a typical current frame.
Figure 2:
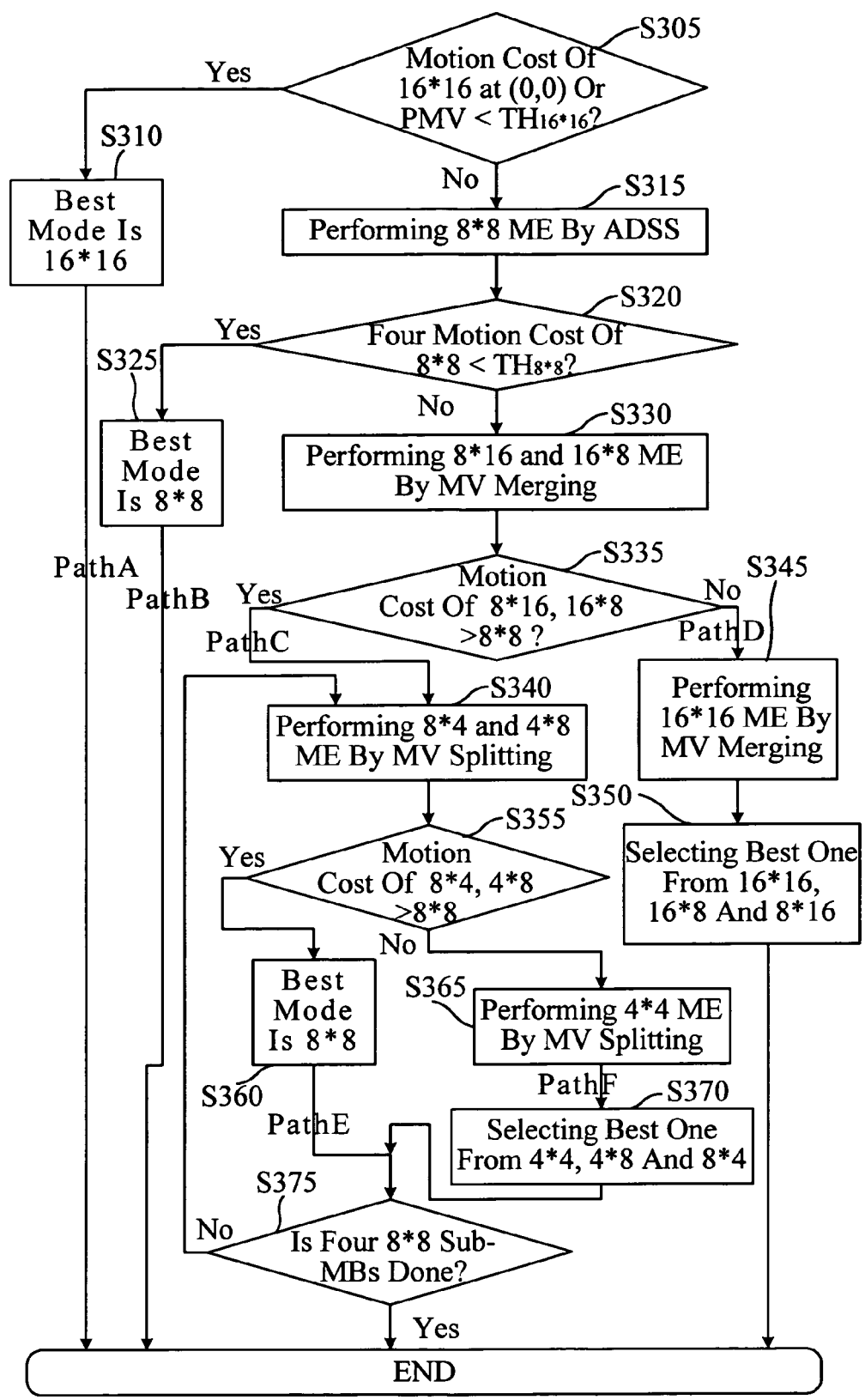
FIG. 2 is a flowchart of a method for fast macroblock mode decision in accordance with the invention.

FIG. 2 is a flowchart of a method for fast macroblock mode decision in accordance with the invention. The method is used in an image frame sequence coding. As shown in FIG. 2, step S305 determines if a motion cost at the origin (0, 0) of the coordinates or a prediction motion vector (PMV) for a 4n*4n macroblock (or briefly, block) is smaller than a first threshold. The motion cost is represented by an equation, $J(m, \lambda_{motion}) = SAD(s, c(m)) + \lambda_{motion} \cdot R(m-p)$, where $m=(m_x, m_y)^T$ indicates a motion vector (MV), $p=(p_x, p_y)^T$ indicates a PMV, $R(m-p)$ is a motion vector information, and $\lambda_{motion} = (0.85 \cdot 2^{QP/3})^{1/2}$ that is a correction factor. The first threshold $TH_{16*16}$ is obtained by adding a minimum motion cost of one selected from previous 20 macroblocks with the 16*16 mode and a first fixed value $\Delta TH_{16*16}$. Namely, the first threshold $TH_{16*16}$ is represented as:

$$TH_{16*16} = \min_{i \in \{i | 1 \le i \le 20, MBi\, with\, mode\, 16*16\}} [cost(MBi)] + \Delta TH_{16*16},$$

and in this case, the first fixed value $\Delta TH_{16*16}$ is set to 600.

Most areas in a frame are the backgrounds and thus regarded as a still or global parallel motion in the motion vector estimation. A still macroblock has a motion vector (0, 0). A macroblock with the global parallel motion can use a prediction motion vector to obtain a preferred estimation. For the background areas, a best mode typically is 16*16. Accordingly, the step S305 determines whether a motion cost at the origin (0, 0) of the coordinates or the prediction motion vector (PMV) for a 16*16 macroblock is smaller than the first threshold.

If the step 305 determines that the motion cost is smaller than the first threshold, step S310 is executed, and conversely step S315 is executed. The step S310 sets the macroblock mode as 16*16 and the motion vector as (0, 0) or the prediction motion vector (PMV) as path A. Next, the mode decision method is end.

Step S315 applies an adaptive diversity search strategy (ADSS) to four 8*8 blocks associated with the 16*16 macroblock for motion estimation (ME).

Step S320 determines whether the four 8*8 blocks respectively have a motion cost are smaller than a second threshold $TH_{8*8}$. The second threshold $TH_{8*8}$ is obtained by adding a minimum motion cost of one selected from previous 20 sub-macroblocks (sub-MBs) with the 8*8 mode and a second fixed value $\Delta TH_{8*8}$. Namely, the second threshold $TH_{8*8}$ is represented by:

$$TH_{8*8} = \min_{i \in \{i | 1 \leq i \leq 20, Sub-MBi\,with\,mode\,8*8\}} [cost(Sub - MBi)] + \Delta TH_{8*8},$$

and in this case, the second fixed value $\Delta TH_{8*8}$ is set to 150. If the motion costs all are smaller than the second threshold $TH_{8*8}$, step S325 is executed, and conversely step S330 is executed.

Step S325 sets the macroblock mode as 8*8. A motion vector of the macroblock is a motion vector (path B) found when the adaptive diversity search strategy (ADSS) executes the motion estimation. Next, the mode decision method is ended.

Step S330 uses a motion vector merge (MVM) to perform the motion estimation on two 16*8 blocks and two 8*16 blocks associated with the 16*16 macroblock.

Step S335 determines whether a total motion cost of the two 16*8 blocks and a total motion cost of the two 8*16 blocks all are greater than a total motion cost of corresponding four 8*8 blocks. In this case, the two 16*8 blocks have a total motion cost of $$\sum_{i=1}^{2} Cost_{16*8}(i),$$

the two 8*16 blocks have a total motion cost of $$\sum_{i=1}^{2} Cost_{8*16}(i),$$

and the four 8*8 blocks have a total motion cost of $$\sum_{i=1}^{4} Cost_{8*8}(i).$$

If the total motion cost of the two 16*8 blocks and the total motion cost of the two 8*16 blocks all are greater than the total motion cost of the four 8*8 blocks, i.e., $$\sum_{i=1}^{2} Cost_{8*16}(i) > \sum_{i=1}^{4} Cost_{8*8}(i) \text{ and } \sum_{i=1}^{2} Cost_{16*8}(i) > \sum_{i=1}^{4} Cost_{8*8}(i),$$

step S340 (path C) is executed, and conversely step S345 (path D) is executed.

Step S345 uses the motion vector merge to perform the motion estimation on the 16*16 macroblock. Step S350 selects one with a minimum motion cost from the 16*16 macroblock, the two 16*8 blocks and the 8*16 blocks as the macroblock mode. Next, the mode decision method is ended.

Step S340 uses a motion vector splitting to perform the motion estimation on two 8*4 blocks and two 4*8 blocks associated with an 8*8 block. Step S355 determines whether a total motion cost of the two 8*4 blocks and a total motion cost of the two 4*8 blocks all are greater than a motion cost of the 8*8 block. In this case, the two 8*4 blocks have the total motion cost of $$\sum_{i=1}^{2} Cost_{8*4}(i),$$

the two 4*8 blocks have the total motion cost of $$\sum_{i=1}^{2} Cost_{4*8}(i),$$

and the 8*8 block has the motion cost of $Cost_{8*8}(i)$. If the total motion cost of the two 8*4 blocks and the total motion cost of the two 4*8 blocks are greater than the motion cost of the 8*8 block, i.e., $$\sum_{i=1}^{2} Cost_{8*4}(i) > Cost_{8*8}(i) \text{ and } \sum_{i=1}^{2} Cost_{4*8}(i) > Cost_{8*8}(i),$$

step S360 (path E) is executed, and conversely step S365 (path F) is executed.

Step S360 sets the macroblock mode as 8*8. Step S365 uses the motion vector splitting to perform the motion estimation on four 4*4 blocks associated with an 8*8 block. Step S370 selects one with a minimum motion cost from the four 4*4 blocks, two 8*4 blocks and two 4*8 blocks as the macroblock mode. Step S375 determines whether the four 8*8 sub-macroblocks are processed completely; if not, the procedure returns to S340 for execution; and if yes, the mode decision method is ended.

FIG. 3 shows a comparison table of excluded mode numbers at different mode decision paths and best modes. Also, FIGS. 4, 5, 6 are comparison tables of a prior low-complexity mode with fast full-search (LCM-FFS), a prior low-complexity mode with fast merge-split search (LCM-MSS) and the invention under different image sequences respectively, wherein FIGS. 4, 5 and 6 uses a Foreman QCIF image sequence, an Akiyo CIF image sequence and a Mobile & Calendar QCIF image sequence respectively. As shown in FIGS. 4, 5 and 6, the invention has the peak signal-to-noise ratio (PSNR) very close to that of LCM-FFS, which only causes a slight bit rate increase. In addition, the inventive computational amount can be reduced to a half as compared to the LCM-FFS and is lower as compared to the LCM-MSS. FIG. 7 is a table of mode exclusion rate and computation reduction analysis, which uses a Foreman QCIF image sequence. As shown in FIG. 7, it is obvious that the invention pre-excludes some modes to thus lead to a significant reduction of the computational amount.

In view of the foregoing, the method for fast macroblock mode decision pre-excludes some modes such that only remaining modes are computed, which can significantly reduce the computational amount, thereby overcoming the prior problem of huge computational amount and further increasing the coding efficiency.

Although the present invention has been explained in relation to its preferred embodiment, it is to be understood that many other possible modifications and variations can be made without departing from the spirit and scope of the invention as hereinafter claimed.

What is claimed is:

1. A method for fast macroblock mode decision, which is used in a frame encoder meeting H.264/MPEG-4 video coding standard, the method comprising:

(A) calculating a motion cost at the origin (0, 0) or a prediction motion vector (PMV) for a 4n*4n macroblock;

(B) deciding a macroblock mode as 4n*4n if the motion cost calculated in step (A) is smaller than a first threshold and ending the method;

(C) using an adaptive diversity search strategy to perform motion estimation on four 2n*2n blocks associated with the 4n*4n macroblock if the motion cost calculated in step (A) is greater than or equal to the first threshold;

(D) calculating all motion costs of the four 2n*2n blocks;

(E) deciding the macroblock mode as 2n*2n if the motion costs of the four 2n*2n blocks calculated in step (D) are smaller than a second threshold;

(F) using a motion vector merge to perform the motion estimation on two 4n*2n blocks and two 2n*4n blocks associated with the 4n*4n macroblock when step (E) decides that any of the motion costs of the four 2n*2n blocks is greater than or equal to the second threshold;

(G) calculating a total motion cost of the two 4n*2n blocks and a total motion cost of the two 2n*4n blocks; and (H) executing a sub-macroblock mode decision step when the two total motion costs calculated in step (0) are greater than the total motion cost of the four 2n*2n blocks, wherein step (H) further comprises:

(H1) using a motion vector splitting to perform the motion estimation on two 2n*n blocks and two n*2n blocks associated with one of the four 2n*2n blocks, (H2) calculating a total motion cost of the two 2n*n blocks and a total motion cost of the two n*2n blocks, (H3) deciding the macroblock mode as 2n*2n when the total motion cost of the two 2n*n blocks and the total motion cost of the two n*2n blocks calculated in step (H2) are greater than the motion cost of the 2n*2n block, and (H4) returning to step (H1) for execution until the four 2n*2n blocks are processed completely.

2. The method as claimed in claim 1, further comprising:

(I) using the motion vector merge to perform the motion estimation on the 4n*4n macroblock if either the total motion cost of the two 4n*2n blocks or the total motion cost of the two 2n*4n blocks calculated in step (G) is smaller than or equal to the total motion cost of the four 2n*2n blocks; and (J) selecting one with a minimum motion cost from the 4n*4n macroblock, the two 4n*2n blocks and the 2n*4n blocks as the macroblock mode, and ending the method.

3. The method as claimed in claim 1, further comprises:

(H5) using the motion vector splitting to perform the motion estimation on four n*n blocks associated with one of the four 2n*2n blocks if either the total motion cost of the two 2n*n blocks or the total motion cost of the two n*2n blocks calculated in step (112) is smaller than or equal to the motion cost of the 2n*2n block;

(H6) selecting one with a minimum motion cost from the four n*n blocks, the two 2n*n blocks and the two n*2n blocks as the macroblock mode; and (H7) returning to step (H1) for execution until the four 2n*2n blocks are processed completely.

4. The method as claimed in claim 1, wherein n is a positive integer.

5. The method as claimed in claim 1, wherein n equals to four.

6. The method as claimed in claim 1, wherein the motion cost is represented by an equation $J(m,\lambda_{motion})=SAD(s,c(m))+\lambda_{motion}\cdot R(m-p)$, where $m(m_x, m_y)^T$ indicates a motion vector (MV), $p=(p_x, p_y)^T$ indicates a prediction motion vector (PMV), $R(m-p)$ is a motion vector information, and $\lambda_{motion}=(0.85\cdot 2^{QP/3})^{1/2}$ that is a correction factor.

7. The method as claimed in claim 1, wherein the first threshold is represented by an equation $$TH_{16*16} = \min_{i\in\{i|1\leq i\leq 20, MBi\,with\,mode\,16*16\}}[\text{cost}(MBi)] + \Delta TH_{16*16}.$$

8. The method as claimed in claim 7, wherein $\Delta TH_{16*16}=600$.

9. The method as claimed in claim 1, wherein the second threshold is represented by an equation $$TH_{8*8} = \min_{i\in\{i|1\leq i\leq 20, Sub\text{-}MBi\,with\,mode\,8*8\}}[\text{cost}(Sub\text{-}MBi)] + \Delta TH_{8*8}.$$

10. The method as claimed in claim 9, wherein $\Delta TH_{8*8}=150$.

11. The method as claimed in claim 1, wherein in step (B), a motion vector of the macroblock is the origin (0, 0) or the prediction motion vector.

12. The method as claimed in claim 1, wherein in step (E), a motion vector of the macroblock is a motion vector obtained by the adaptive diversity search strategy.

13. A method for fast macroblock mode decision, which is used in a frame encoder meeting H.264/MPEG-4 video coding standard, the method comprising:

(A) determining if a motion cost at the origin (0, 0) or a prediction motion vector (PMV) for a 4n*4n macroblock is smaller than a first threshold;

(B) if the motion cost is smaller than the first threshold, deciding a macroblock mode as 4n*4n and ending the method;

(C) if the motion cost is greater than or equal to the first threshold, using an adaptive diversity search strategy to perform motion estimation on four 2n*2n blocks associated with the 4n*4n macroblock;

(D) determining if all motion costs of the four 2n*2n blocks in step (C) are smaller than a second threshold;

(E) if step (D) decides that the motion costs of the four 2n*2n blocks are smaller than the second threshold, choosing the macroblock mode as 2n*2n and ending the method;

(F) when step (D) decides that any of the motion costs of the four 2n*2n blocks is greater than or equal to the second threshold, using a motion vector merge to perform the motion estimation on two 4n*2n blocks and two 2n*4n blocks associated with the 4n*4n macroblock;

(G) determining if a total motion cost of the two 4n*2n blocks and a total motion cost of the two 2n*4n blocks are greater than a total motion cost of the four 2n*2n blocks; and (H) when step (G) decides that the two total motion costs are greater than the total motion cost of the four 2n*2n blocks, executing a sub-macroblock mode decision step which contains, wherein step (H) further comprises:

(H1) using a motion vector splitting to perform the motion estimation on two 2n*n blocks and two n*2n blocks associated with one of the four 2n*2n blocks, (H2) determining if a total motion cost of the two 2n*n blocks and a total motion cost of the two n*2n blocks are greater than a motion cost of the 2n*2n block, (H3) when sty (H2) decides that the total motion cost of the two 2n*n blocks and the total motion cost of the two n*2n blocks are greater than the motion cost of the 2n*2n block, choosing the macroblock mode as 2n*2n, and (H4) returning to step (H1) for execution until the four 2n*2n blocks are processed completely.

14. The method as claimed in claim 13, further comprising:

(I) if step (G) decides that either the total motion cost of the two 4n*2n blocks or the total motion cost of the two 2n*4n blocks is smaller than or equal to the total motion cost of the four 2n*2n blocks, using the motion vector merge to perform the motion estimation on the 4n*4n macroblock; and (J) selecting one with a minimum motion cost from the 4n*4n macroblock, the two 4n*2n blocks and the 2n*4n blocks as the macroblock mode, and ending the method.

15. The method as claimed in claim 13, further comprises:

(H5) if step (H2) decides that either the total motion cost of the two 2n*n blocks or the total motion cost of the two n*2n blocks is smaller than or equal to the motion cost of the 2n*2n block, using the motion vector splitting to perform the motion estimation on four n*n blocks associated with one of the four 2n*2n blocks;

(H6) selecting one with a minimum motion cost from the four n*n blocks, the two 2n*n blocks and the two n*2n blocks as the macroblock mode; and (H7) returning to step (H1) for execution until the four 2n*2n blocks are processed completely.

16. The method as claimed in claim 13, wherein the motion cost is represented by an equation $J(m,\lambda_{motion})=SAD(s,c(m))+\lambda_{motion} \cdot R(m-p)$, where $m(m_x, m_y)^T$ indicates a motion vector (MV), $p=(p_x, p_y)^T$ indicates a prediction motion vector (PMV), $R(m-p)$ is a motion vector information, and $\lambda_{motion}=(0.85 \cdot 2^{QP/3})^{1/2}$ that is a correction factor.

17. The method as claimed in claim 13, wherein the first threshold is represented by an equation $$TH_{16*16} = \min_{i \in \{i | 1 \le i \le 20, MBi\ with\ mode\ 16*16\}} [\text{cost}(MBi)] + \Delta TH_{16*16}.$$

18. The method as claimed in claim 17, wherein $\Delta TH_{16*16}=600$.

19. The method as claimed in claim 13, wherein the second threshold is represented by an equation $$TH_{8*8} = \min_{i \in \{i | 1 \le i \le 20, Sub\text{-}MBi\ with\ mode\ 8*8\}} [\text{cost}(Sub\text{-}MBi)] + \Delta TH_{8*8}.$$

20. The method as claimed in claim 19, wherein $\Delta TH_{8*8}=150$.

* * * * *